(No Model.) 8 Sheets—Sheet 3.
O. W. BERGMAN & E. TERNSTRÖM.
BREECH MECHANISM FOR ORDNANCE.
No. 520,029. Patented May 22, 1894.
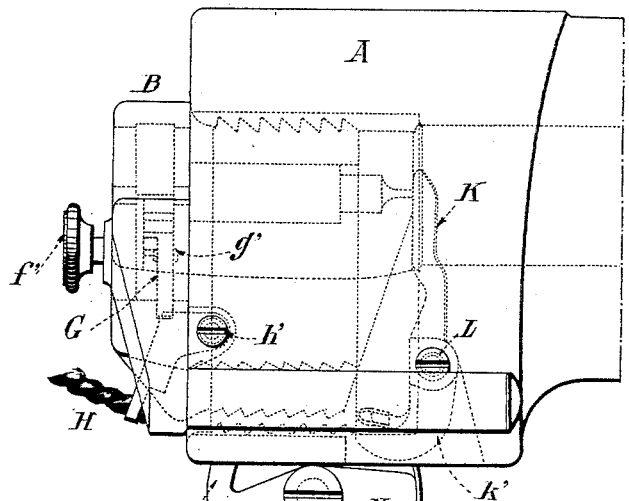
FIG-7-
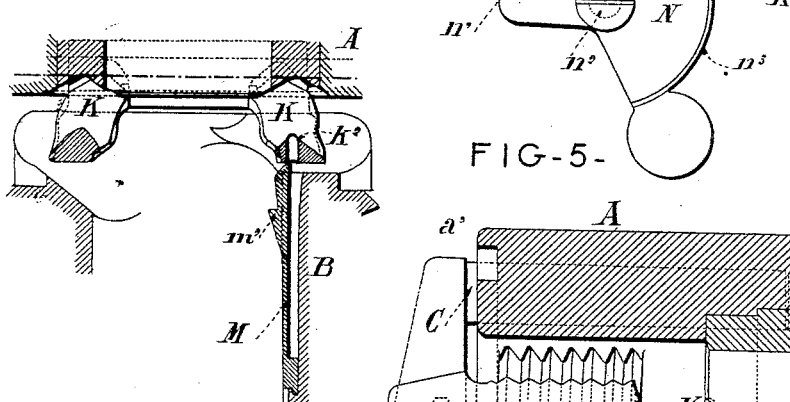
FIG-6-
FIG-5-
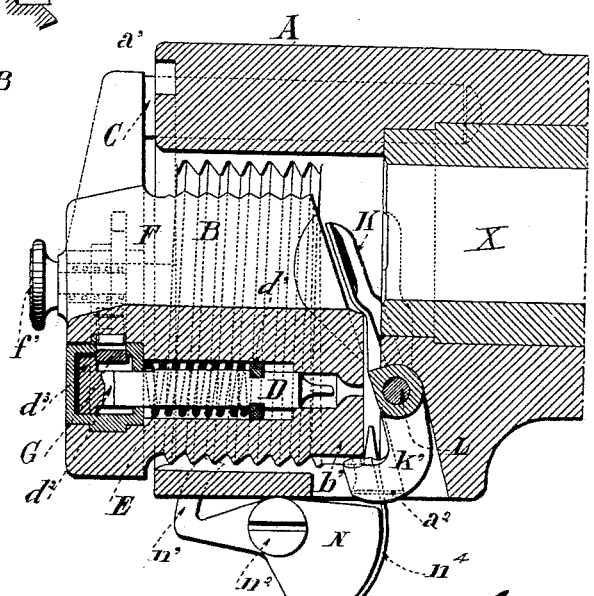

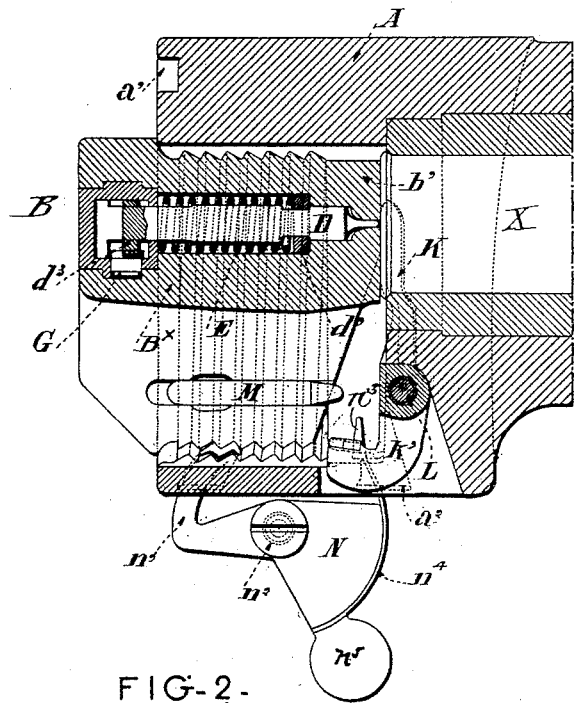
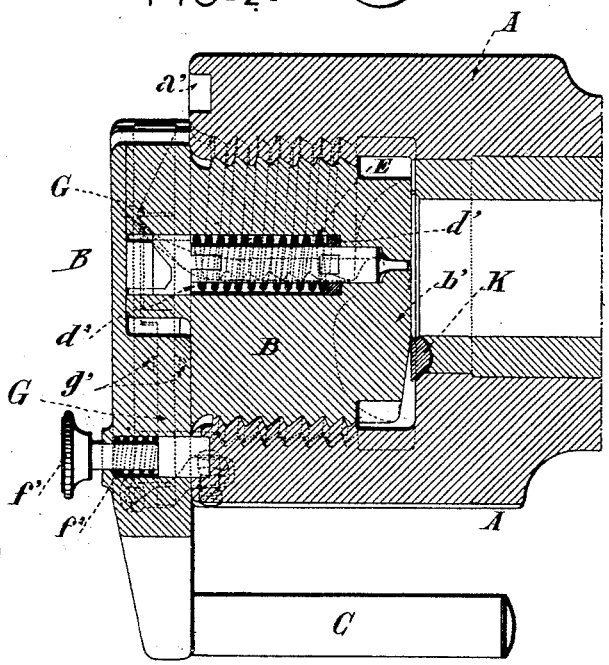

(No Model.) 8 Sheets—Sheet 4.
O. W. BERGMAN & E. TERNSTRÖM.
BREECH MECHANISM FOR ORDNANCE.
No. 520,029. Patented May 22, 1894.

WITNESSES:

INVENTORS
Oskar W. Bergman
Ernst Ternström
BY Briesen & Knauth
ATTORNEYS.

(No Model.) 8 Sheets—Sheet 5.

O. W. BERGMAN & E. TERNSTRÖM.
BREECH MECHANISM FOR ORDNANCE.

No. 520,029. Patented May 22, 1894.

WITNESSES
R. B. Shepherd.
Chas. E. Smith.

INVENTORS
Oskar Wm. Bergman,
Ernst Ternström,
BY Briesen & Knauth
ATTORNEYS.

(No Model.) 8 Sheets—Sheet 6.
O. W. BERGMAN & E. TERNSTRÖM.
BREECH MECHANISM FOR ORDNANCE.
No. 520,029. Patented May 22, 1894.

(No Model.) 8 Sheets—Sheet 7.

O. W. BERGMAN & E. TERNSTRÖM.
BREECH MECHANISM FOR ORDNANCE.

No. 520,029. Patented May 22, 1894.

Witnesses:
L. M. Hackedley
Henry E. Everding

Inventors:
Oskar W. Bergman,
Ernst Ternström
By Briesen & Knauth
their Attorneys (No Model.) 8 Sheets—Sheet 8.
O. W. BERGMAN & E. TERNSTRÖM.
BREECH MECHANISM FOR ORDNANCE.
No. 520,029. Patented May 22, 1894.
FIG. 25.
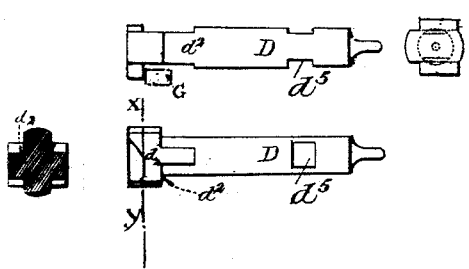
FIG. 27.
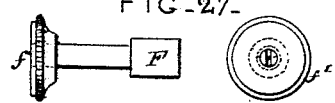
FIG. 26.
FIG. 28.
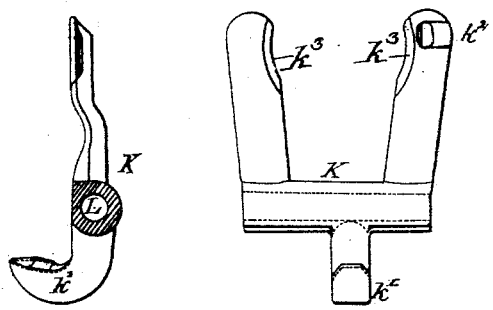
FIG. 29.
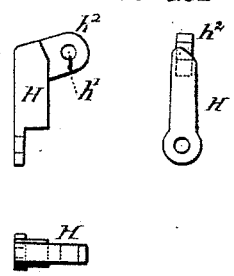
FIG. 32.
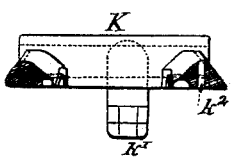
FIG. 30.
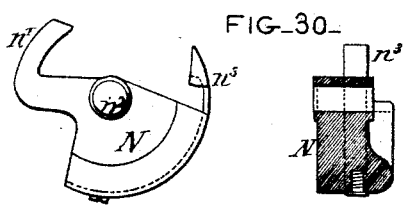
FIG. 33.
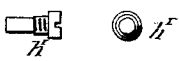
FIG. 31.
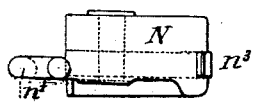
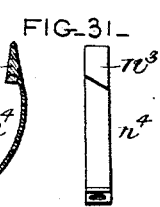
FIG. 34.
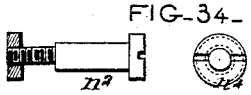
Witnesses:
L. M. Wachschlager.
Geo. E. Morse
Inventors:
Oskar Wm. Bergman
Ernst Ternström
By Briesen & Knauth
their Attorneys

UNITED STATES PATENT OFFICE.

OSKAR WILLIAM BERGMAN AND ERNST TERNSTRÖM, OF PARIS, FRANCE.

BREECH MECHANISM FOR ORDNANCE.

SPECIFICATION forming part of Letters Patent No. 520,029, dated May 22, 1894.

Application filed April 30, 1891. Serial No. 391,066. (No model.)

*To all whom it may concern:*

Be it known that we, OSKAR WILLIAM BERGMAN, lieutenant of the artillery in the Swedish Army, of Gothenburg, Sweden, residing at Paris, France, and ERNST TERNSTRÖM, civil engineer, residing at Paris, France, have invented a new and useful Improvement in Breech-Loading Ordnance, of which the following is a full, clear, and exact description.

Our invention relates to that class of ordnance known as breech loading ordnance and consists in a gun having a breech provided with a cylindrical threaded opening eccentric to the axis of the bore of the gun and an externally threaded breech block adapted to rotate in said breech opening in combination with mechanism for firing the cartridge.

Our invention further consists in a novel extractor for the cartridge shell actuated by the movement of the breech block and also of a means for locking the breech block from rotation when it is in the firing position and for automatically unlocking the same when the gun has been fired.

Our invention further consists of certain other details of construction hereinafter more fully described and pointed out in the claims.

Figure 3:
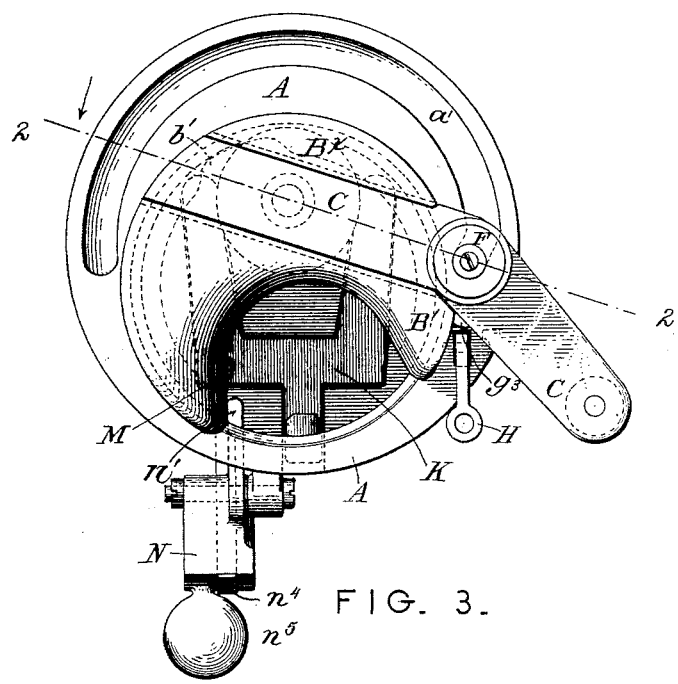
Figure 4:
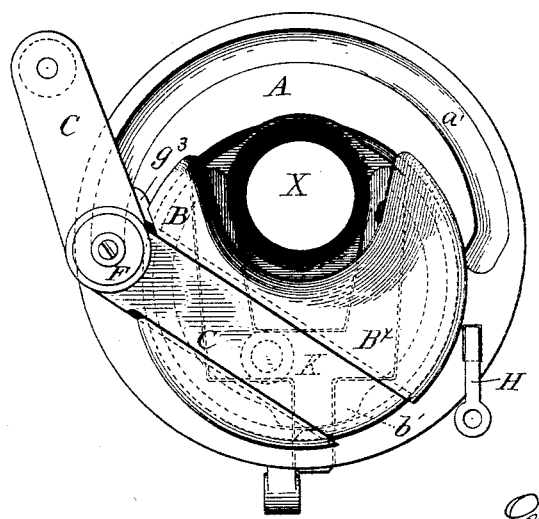
Figure 7A:
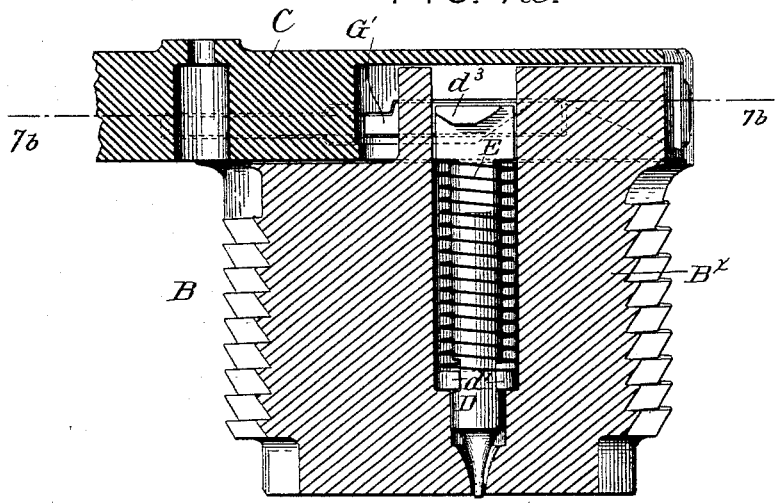
Figure 7B:
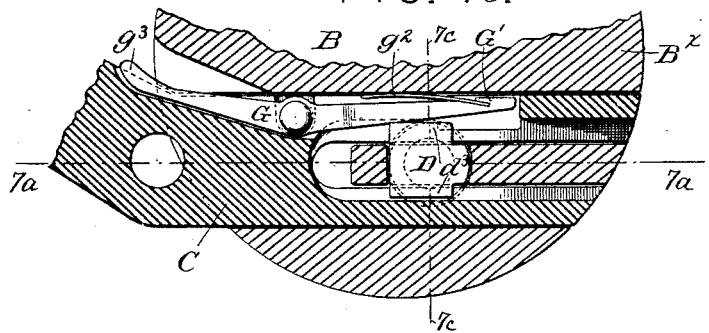
Figure 7C:
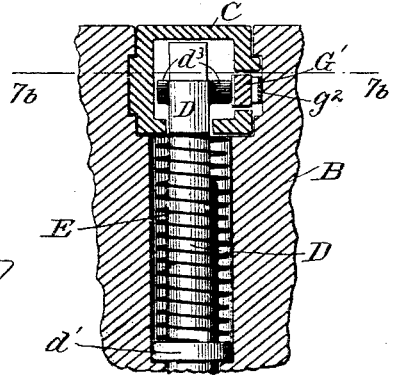
Figure 8:
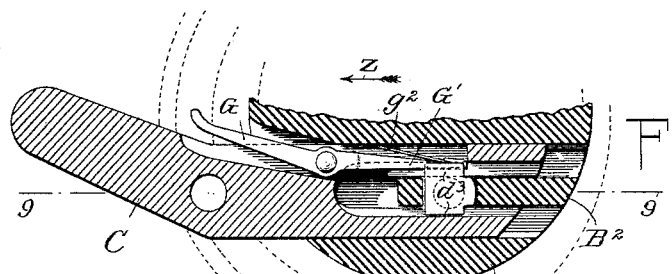
Figure 9:
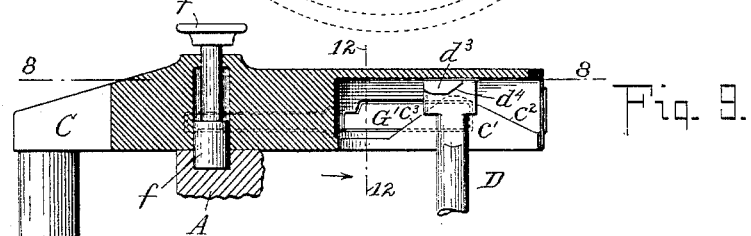
Figure 10:
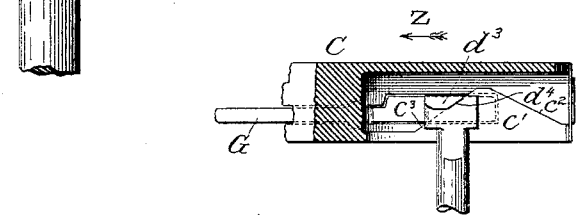
Figure 11:
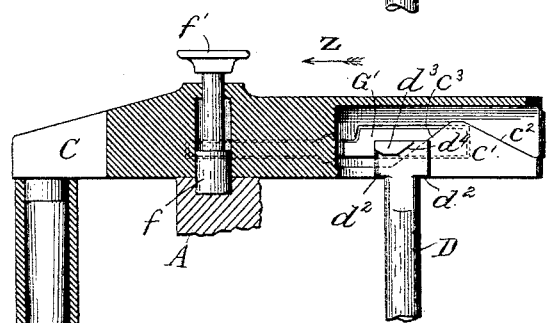
Figure 12:
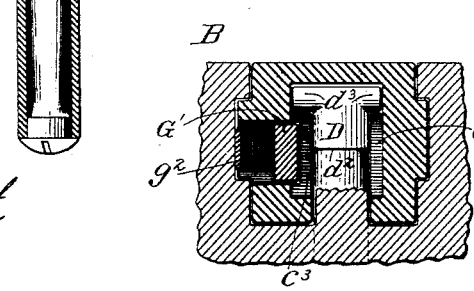
Figure 13:
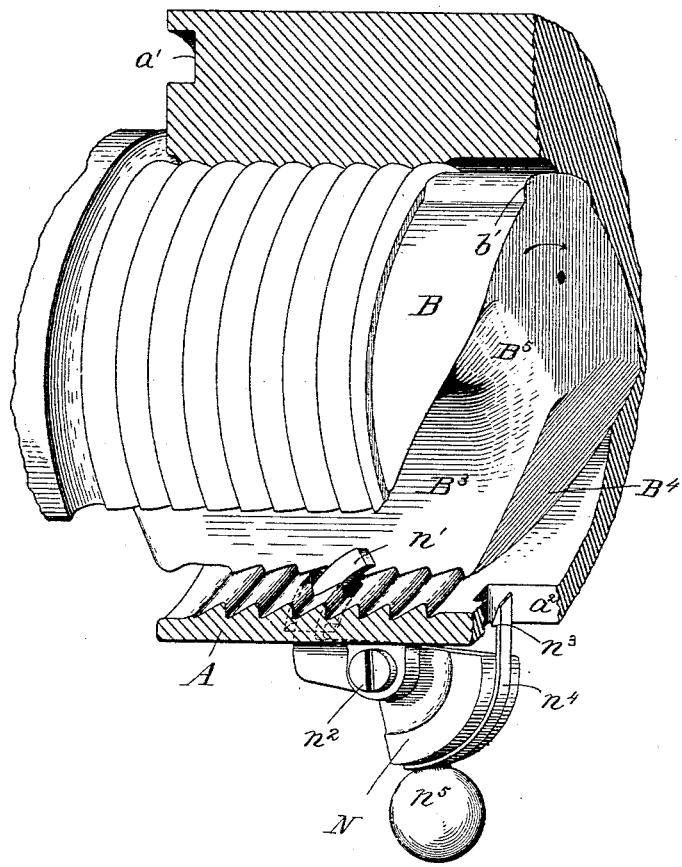
Figure 14:
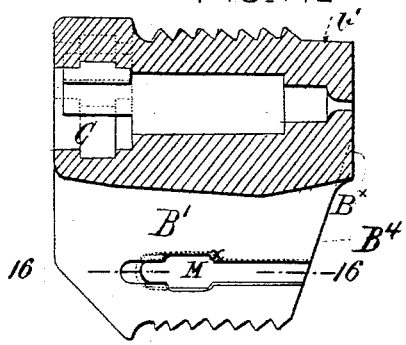
Figure 15:
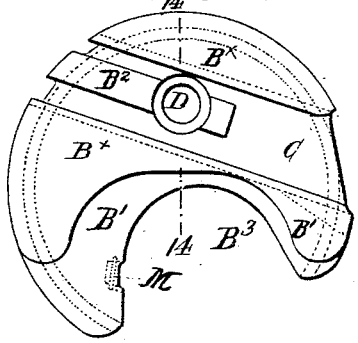
Figure 16:
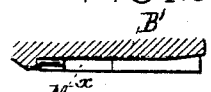
Figure 20:
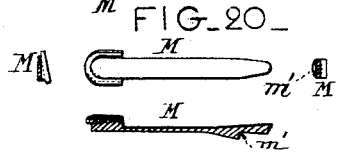
Figure 17:
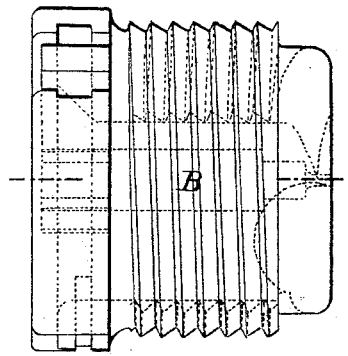
Figure 18:
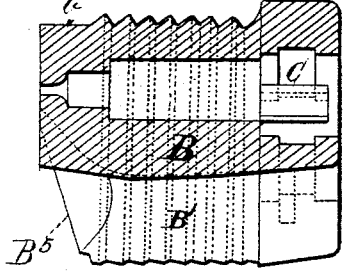
Figure 21:
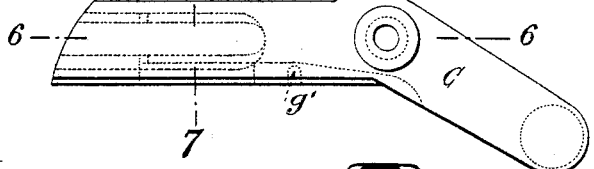
Figure 23:
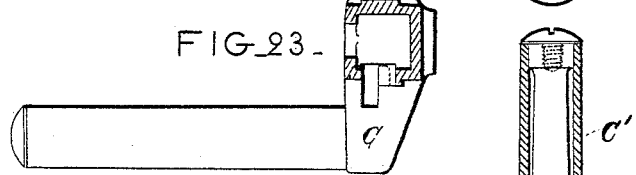
Figure 24:
Figure 22:
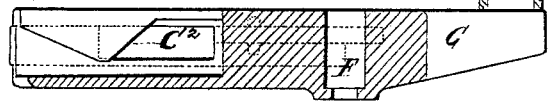
Figure 19:
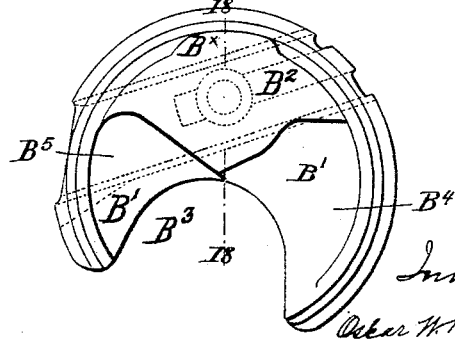

In the accompanying drawings: Figure 1 is a central longitudinal section of the breech and breech-block, the shot having been fired and the breech-block closed up against the rear end of the gun barrel. Fig. 2 is a cross-section on line 2—2 of Fig. 3. Fig. 3 is a rear view of the breech, the breech-block being closed as in Fig. 1. Fig. 4 is a similar view, the breech-block being open. Fig. 5 is a central longitudinal section of the breech and breech-block, the breech-block being open, as in Fig. 4. Fig. 6 is a detail view of the extractor, a portion of the other parts being shown in section. Fig. 7 is a side view of the breech and outwardly extending portion of the breech-block, the breech-block being in the position shown in Figs. 1, 2 and 3. Fig. 7ª is a longitudinal section on the line 7ª—7ª, Fig. 7ᵇ, showing the connection between the parts in the breech-block. Fig. 7ᵇ is a transverse section of the same on the lines 7ᵇ—7ᵇ of Figs. 7ª and 7ᶜ. Fig. 7ᶜ is a longitudinal section of the same on the line 7ᶜ—7ᶜ, Fig. 7ᵇ. Fig. 8 is a sectional detail of the operating lever C, firing-pin and connections, on the line 8—8 of Fig. 9, with the addition of a portion of the breech-block shown in dotted lines. Fig. 9 is a longitudinal section of the same on the line 9—9, Fig. 8, showing the parts in the position represented in Fig. 8. Fig. 10 is a similar view to that shown in Fig. 9, showing the firing-pin D before it has reached its rear limit of motion. Fig. 11 is a like view of the same, showing the firing-pin in its lowest position, or that which it attains when released by the sear. Fig. 12 is a transverse section on line 12—12 of Fig. 9, looking in the direction of the arrow. These views, Figs. 9, 10, 11 and 12 indicate the function of the sear G through the movement of the trigger H, and also the manner in which the sear maintains the firing-pin D in its rear position. Fig. 13 is a detail orthographic view partly in section, of the breech and breech-block, clearly showing the position of the breech-block locking mechanism in the locked position. Fig. 14 is a longitudinal section in detail of the breech-block taken on line 14—14, Fig. 15. Fig. 15 is a rear end view of the breech-block, showing the recess adapted to register with the bore of the gun. Fig. 16 is a detail view in longitudinal section on line 16—16, Fig. 14, showing the aperture for the spring M. Fig. 17 is a top view of the breech-block when in the position shown in Fig. 14. Fig. 18 is a longitudinal section of the breech-block on line 18—18, Fig. 19. Fig. 19 is a front end view of the breech-block. Fig. 20 shows in detail four different views, the retaining-spring M. Fig. 21 is an end view of the operating-lever. Fig. 22 is a longitudinal section of the same on line 6—6, Fig. 21. Fig. 23 is a transverse section of the same on line 7—7, Fig. 21. Fig. 24 shows in detail different views of the sear. Fig. 25 shows detail views of the firing-pin. Fig. 26 represents a plan and section view of the forked washer or slide of the firing-pin for controlling the spring thereof. Fig. 27 shows detail views of the holding bolt. Fig. 28 shows detail views in plan and in vertical and cross-section of the extractor. Fig. 29 shows detail views of the trigger. Fig. 30 shows detail views of the lever which locks the breech-block, when the breech is closed. Fig. 31 shows detail views of the spring controlling the locking lever. Fig. 32 is a side view of the pin or bolt on which the extractor rotates. Fig. 33 is a side and end view of the stud on which the trigger turns; and Fig. 34 is a side and end view of the stud on which the breech-block locking-lever turns.

In said drawings, A represents a gun-breech, and A′ a gun-barrel. The rear portion of the breech A has a longitudinal cylindrical opening and preferably an interrupted screw-thread on its inner face or bore, the axial line of this cylindrical opening being eccentric to or different from the axial line of the bore of the gun. Within the opening in the breech A is fitted a breech-block B with screw threads on its periphery adapted to fit into the threads on the inside of said breech opening and be rotated therein. This breech-block is formed of a heavy or full portion $B^x$, and a lower lighter or depending portion B′. This lower portion B′ is provided with a longitudinal recess $B^3$, shown clearly in Figs. 3, 4, 15 and 19 for receiving the cartridge and through which it is forced or pushed into the barrel or bore of the gun X. To prevent a possible rebounding or backward movement of the cartridge before the breech-block is turned, we provide a spring M in a recess or slot $M^x$ (Figs. 14 and 16) in one side of the part B′ of the breech-block, and within the recess $B^3$ of said breech-block, as shown in Figs. 1, 14, 15 and 16. A backward movement of the cartridge is prevented by a shoulder $m'$ on the rear end of the spring M (Fig. 20), the forward portion being beveled to allow the free passage of the cartridge over the shoulder $m'$ when the cartridge is pushed through the recess $B^3$ in the breech-block.

The cartridge will be forced into its proper position in the firing chamber X of the barrel or bore of the gun by the forward movement and turning of the breech-block which brings a cam-face $B^5$ of the breech-block against the base $x$ of the cartridge when the lever C is turned, as shown in Figs. 1, 2, 7 and 13.

Across the rear face of the full portion B of the breech-block is formed a dovetailed slot, as shown in Figs. 15 and 19, in which operates a reciprocating lever C, extending beyond the outer periphery of the breech-block, and provided with a handle C′, shown in Figs. 2, 3, 4, 8, 9, 21 and 22. This lever is adapted to turn the breech-block in the breech and is apertured at its inner end, to embrace the narrow portion $B^2$ (Figs. 15 and 19) in which rests and reciprocates the rear portion of the firing-pin D, as will be hereinafter described.

In the rear face of the breech A is cut a semi-circular groove $a'$ concentric with the axis of the breech and gun-barrel, and eccentric to the axis of the breech opening, as shown in plan view in Figs. 3 and 4, and in section in Figs. 1, 2 and 5, in which moves the inner end of a pin F, carried by the lever C. This pin is adapted to move, and is held in its normal position in the groove $a'$ by a spring $f^2$, and said pin is provided on its outer end with a finger piece $f'$, by which the pin F can be withdrawn from and held out of contact with the groove $a$.

When the pin F is in the groove $a'$ and the lever C is turned, the breech-block will turn on the threaded portion on the inside of the breech, and inasmuch as the longitudinal axis of the breech-block is eccentric to the axis of the breech and the gun-barrel, necessarily a sliding movement of the lever C in the groove of the breech-block will be effected.

Within the full portion B of the breech-block and preferably in the longitudinal center of said portion is formed an opening adapted to receive the reciprocating firing-pin D, shown in detail in Fig. 25. This firing-pin is pointed at its forward end where it comes in contact with the cartridge to be fired. The rear end of the firing-pin is formed with shoulders $d^2$ and $d^3$ at right angles to each other. Near the forward end of the firing-pin are formed notches $d^5$, shown in Fig. 25, in which is loosely fitted a forked washer $d'$, shown in detail in Fig. 26. Between this washer $d'$ and the shoulder $d^2$, and surrounding the main portion of the body of the firing-pin D is arranged a spring E. When the firing-pin is drawn back it compresses the spring E. This movement of the firing-pin is caused by a transverse displacement of the lever C, when it moves in the block B at right angles to the axis of said block, as has been hereinbefore described. The two projections $d^3$ $d^3$ on the firing-pin (see Fig. 25) have cam-faces $d^4$ on the front portion thereof. The lower edges of the groove of the lever C (Figs. 9, 10, 11 and 12) in which is engaged the rear portion of the firing-pin are not straight, but each present cam projections $c'$, of which the faces $c^2$ $c^3$ form inclined planes inversely arranged to those which form the faces $d^4$ of the projections $d^3$ of the firing-pin.

Figs. $7^a$ to 12 inclusive show the different positions the parts assume during the firing of the gun. In opening the breech the lever C executes a rectilinear transverse motion in the direction of the arrow Z and the cam faces $c^2$ $c^3$ of the lever will bear against the faces $d^4$ of the firing-pin. Now, this firing-pin is movable longitudinally. Therefore, when the movement of the lever in the direction of the arrow Z continues, the inclined faces $c^2$ $c^3$ in abutting against cam faces $d^4$ of the firing-pin, will withdraw said firing-pin to the elevated or cocked position, as shown in Fig. 8. It will thus be seen that the transverse movement of the lever in the breech-block while opening the breech will serve to cock the gun. When the firing-pin D has reached its rear position, it will then be held in that position by the inside end G′ of a sear G normally held by the action of the spring $g^2$ (Figs. $7^a$, $7^b$, $7^c$, 8, 9, 10, 11, 12 and 24), so as to come under one of the shoulders $d^3$. This sear G is shown in detail in Fig. 24, wherein G represents the main portion, provided on its sides with pins or projections $g'$ on which it oscillates. This sear with its spring $g^2$, rests in a recess (see Fig. $7^b$) in the lever C, and so arranged that the rear portion of the sear shall be held within the recess by the side of the dovetailed slot in which the lever C moves, and when the firing-pin has reached its rear position, the inner or rear portion of the sear will be forced by the spring $g^2$ through an opening in the lever C under one of the lugs $d^3$ of the firing-pin, and hold it in that position until released, as hereinafter described.

In order to release the firing-pin and allow the pointed end to strike the cartridge, a trigger is pivoted at $h'$ to the gun breech, its upper end preferably being straight and beveled as shown at $h^2$, Fig. 29, and adapted to bear against the under-side $g^3$ of the sear G (Fig. 3). The lower portion of the trigger H may be provided, if desired, with means for connecting a firing lanyard, as shown and as will be understood. By drawing on the lanyard, or pulling the lower end of the trigger to the rear, the inner end G' of the sear G will be released from the under side of the lug $d^3$ of the firing-pin, and the firing-pin will be driven with great force by the spring E against the cartridge and explode it. The point of the firing-pin will be released from immediate contact with the cartridge after firing it through the rebounding action of the spring E on the shoulder $d^2$ of the firing-pin.

In order to withdraw or eject the cartridge shell, after it has been fired, we employ an extractor K operating in a recess in the gun breech, as shown in Figs. 1, 3, 4 and 5, and shown in detail in Fig. 28. This extractor is constructed and arranged to oscillate on a rod L supported in the lower part of the breech and at right angles to the axis of the gun-barrel. The upper part of this extractor and above the rod L, is forked, while the lower part is curved to the rear, with its end $k'$ extending slightly upward, as shown in Fig. 28. The inner sides of the arms of the fork are formed with concave recesses $k^3$. These recesses $k^3$ should be so arranged on the arms that they will partially surround the case of the cartridge immediately in rear of the base $x$ thereof, when in position in the bore or barrel of the gun, as shown in Figs. 1 and 7. The rear movement of the forked arm of the lever K is effected in the following manner: The periphery of the breech-block is made without threads at the forward end, and has a shoulder or cam $b'$ (Fig. 13) formed thereon which in the rotation of the breech-block will bear against the portion $k'$ of the extractor K pressing it down and forcibly pushing the part $k^3$ rearward and with it the discharged cartridge shell, the extractor being then in the position shown in Figs. 4 and 5.

Upon the outside of one of the arms of the forked portion of the extractor K is formed a recess $k^2$ corresponding to spring M and against one of the walls of which the cam-face on the spring bears when the extractor with the cartridge shell is being moved backward, thus preventing the spring M or its shoulder $m'$ from interfering with or obstructing the discharge or ejectment of the cartridge shell.

In order to prevent the opening or backward movement of the breech-block in the event that the cartridge has not been discharged, an automatic gravity lever N is employed. (See Figs. 1, 3, 5 and 13.) This lever is pivoted at $n^2$ to the under side of the breech, the rear portion of said lever having an upwardly turned hook or stop $n'$, as clearly shown in Figs. 3 and 13. This stop passes through an opening in the lower part of the breech A, and is adapted, when the breech-block is in a firing position, to bear against the edge of the breech-block at the lower portion B', where it is apertured to form the cartridge receiving opening, thus preventing the opening or backward movement of the breech-block, as will be hereinafter more fully described.

The forward portion of the lever N is preferably formed with its outer edge concentric to the pivot $n^2$, and upon its outer periphery is secured a spring $n^4$ extending upward and beyond the lever N, and provided on its outer end with a shoulder extension $n^3$, this spring extension being adapted to pass through an opening $a^2$ in the lower part of the breech A, as shown in Figs. 1, 5 and 13. When this lever N is in the position shown in Fig. 1, the shoulder $n^3$ of the spring $n^4$ will be thrown over upon the inner surface of the breech A and the end $n'$ of the lever N will be held out of contact with the breech-block B and thus allow the breech-block to be turned in the breech. The lower end of the lever N is provided with a ball or weight $n^5$, having its center of gravity outside the axis of rotation, so that when the shoulder $n^3$ is released from contact with the breech A the weight or ball will cause the lever N, through force of gravity, to assume the position shown in Fig. 13, the hooked end or stop $n'$ being forced in the cartridge receiving opening in the lower portion B' of the breech-block, and bearing against the edge thereof will prevent its being turned in the breech. If the firing-pin has for any reason failed to fire the cartridge, the lever N is forced back by hand into the disengaged position, with the shoulder $n^3$ of the spring in contact with the breech. This movement causes the resetting of the firing-pin and allows at the same time an inspection and if necessary a withdrawal of the cartridge. The lever will again automatically assume the position shown in Fig. 13 when the breech-block is turned to the firing position and thus prevent the breech-block from being turned, or the firing-pin may be reset by merely withdrawing the pin F of lever C and moving said lever transversely, thus drawing back the firing-pin ready to be released by the sear to fire the cartridge as heretofore described. The cartridge having been fired, the lower part of the lever N is forced forward by the recoil of the gun, thus causing the shoulder $n^3$ to spring over the edge of the breech, holding the lever and the arm $n'$ in the position shown in Fig. 1 when the breech-block can be turned again as desired. As the breech-block is turned the front cam-face $B^4$ thereon will press against the shoulder $n^3$ forcing it out of contact with the breech and allow the lever N to automatically assume the position shown in Fig. 13, and prevent any rotation of the breech-block while the gun is being fired.

In order to remove the breech-block and the various parts connected therewith, the spring-pressed pin F is first withdrawn from the slot or groove $a'$; the lever C can then be withdrawn from the groove in the rear of the breech-block; all the parts constituting the firing mechanism, viz: the firing-pin, the spring controlling the firing-pin, the forked plate controlling the firing-pin spring, the sear, &c., can be readily removed. The breech-block can then be withdrawn by unscrewing it from the breech after removing the spring M in the side of the lower part of the breech-block. To remove the extractor, the rod L is first withdrawn from its bearings in the breech, when the extractor itself can be easily removed from its recess. The replacement of the parts in proper position will be effected in an inverse manner, as will be manifest.

The various parts being in position, the mode of operation is as follows: The breech-block is first turned by means of the lever C in the breech into such position that the recess $B^3$ shall be in line with the bore of the gun. The cartridge is then inserted in the recess and forced into the bore. The act of turning the breech-block by the lever C in this position causes the cam $c$ to lift and set the firing-pin in its rear position upon the end $G'$ of the sear G, as has been hereinbefore described, where it will be held. The breech-block is then turned until the pin F reaches the end of the groove $a'$, when the firing-pin is in direct line with the fire of the cartridge, the cartridge itself being properly located in the barrel by the action of the front cam-face $B^5$ of the breech-block, as heretofore described. The outer end of the sear will then be in position over the portion $h^2$ of the trigger, as shown in Fig. 3. When the breech-block is in this position the end $n'$ of the lever N will engage the same, as shown in Fig. 13 and the extractor will be closed, as shown in dotted lines in Fig. 1. The gun is now ready for the firing of the cartridge. The lower end of the trigger is drawn backward, thus forcing the upper part $h^2$ against the under side of the outer end of the sear, and releasing the inner end from contact with the lug $d^3$ on the rear of the firing-pin, which will then be driven with great force against the base of the cartridge by means of the spring E, and cause the cartridge to be discharged. The means of extracting the cartridge shell after firing has already been described.

Having thus described our invention, what we claim is—

1. In a breech loading gun, the combination with a barrel provided with a firing chamber, of a breech provided with a cylindrical threaded opening eccentric to the axis of the bore of said barrel, a threaded breech-block adapted to rotate in said breech opening, and means actuated by the rotation of the breech-block for extracting the cartridge shell after firing, substantially as described and set forth.

2. In a breech loading gun, the combination with a barrel provided with a firing chamber, of a breech provided with a cylindrical threaded opening eccentric to the axis of the bore of said barrel, a threaded breech-block adapted to rotate in said breech opening, and a freely swinging locking device on said breech, and engaging with the breech-block when the breech-block is in the firing position to lock the same from movement, and disengaged therefrom to the recoil of the gun when the same is fired, and a cam face on the breech-block engaging with the locking device to swing the same to lock the breech-block from movement when the breech-block has been moved into the firing position, substantially as described.

3. In a breech loading gun, the combination with a barrel provided with a firing chamber, of a breech provided with a cylindrical threaded opening eccentric to the axis of the bore of said barrel, a cam device on the breech, a threaded breech-block adapted to rotate in said breech opening, and a reciprocating lever connected to said breech block for rotating the same and engaging with the cam device on the breech, whereby upon rotation of the breech-block the lever will be reciprocated, substantially as described.

4. In a breech loading gun, the combination with a barrel provided with a firing chamber, of a breech provided with a cylindrical threaded opening eccentric to the axis of the bore of said barrel, a threaded breech-block provided with a cartridge receiving opening therein and adapted to rotate in said breech opening, and a spring in said cartridge receiving opening adapted to prevent backward movement of the cartridge when it has passed said spring, substantially as described and for the purposes set forth.

5. In a breech loading gun, the combination of a breech provided with a cylindrical threaded opening eccentric to the axis of the bore of the barrel, a cam groove in said breech eccentric to the axis of the opening therein, a threaded breech-block adapted to rotate in said breech opening, a lever on said breech-block having a pin operating in the groove in the breech, a firing-pin withdrawn automatically by said lever, and an extractor automatically operated by the rotation of the breech-block, substantially as described and for the purposes set forth.

6. In a breech loading gun, the combination with a breech and breech-block of a firing mechanism, said firing mechanism combining therein a firing-pin adapted to reciprocate in an opening in said block, and having cam-faces thereon, a spring arranged to control said firing-pin, a lever adapted to reciprocate transversely to the bore of the gun, and provided with cam faces co-operating with the cam faces on the firing-pin to force said pin backward, a sear and a trigger, all said parts being arranged and adapted to operate, substantially as described and in the manner and for the purposes set forth.

In witness whereof we have hereunto set our hands in presence of two witnesses.

OSKAR WILLIAM BERGMAN.
ERNST TERNSTRÖM.

Witnesses:
 A. HUBANT,
 GEORGES LAURENT.